United States Patent
Merlin et al.

(10) Patent No.: US 9,226,241 B2
(45) Date of Patent: Dec. 29, 2015

(54) SYSTEMS AND METHODS FOR LOW POWER MEDIUM ACCESS

(75) Inventors: Simone Merlin, San Diego, CA (US); Santosh Paul Abraham, San Diego, CA (US); Rahul Dangui, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 34 days.

(21) Appl. No.: 13/601,079

(22) Filed: Aug. 31, 2012

(65) Prior Publication Data

US 2013/0235770 A1 Sep. 12, 2013

Related U.S. Application Data

(60) Provisional application No. 61/530,735, filed on Sep. 2, 2011.

(51) Int. Cl.
*H04W 52/02* (2009.01)

(52) U.S. Cl.
CPC ............ *H04W 52/0238* (2013.01); *Y02B 60/50* (2013.01)

(58) Field of Classification Search
CPC ................................................ H04W 52/0238
USPC .................................... 370/311, 366; 709/225
See application file for complete search history.

(56) References Cited

U.S. PATENT DOCUMENTS

| | | | |
|---|---|---|---|
| 5,355,518 A * | 10/1994 | Kindinger et al. ........... | 340/7.34 |
| 6,088,602 A * | 7/2000 | Banister ........................ | 455/574 |
| 6,453,181 B1 * | 9/2002 | Challa et al. .................. | 455/574 |
| 6,735,454 B1 * | 5/2004 | Yu et al. ........................ | 455/574 |
| 6,928,289 B1 * | 8/2005 | Cho et al. .................... | 455/452.2 |
| 7,245,946 B2 | 7/2007 | Liu | |
| 7,508,781 B2 | 3/2009 | Liu et al. | |
| 7,653,397 B2 | 1/2010 | Pernu et al. | |
| 2003/0086437 A1 * | 5/2003 | Benveniste ................... | 370/461 |
| 2003/0114168 A1 * | 6/2003 | Shi et al. ....................... | 455/456 |
| 2003/0174690 A1 * | 9/2003 | Benveniste ................... | 370/350 |
| 2003/0190937 A1 * | 10/2003 | Karmi et al. .................. | 455/574 |
| 2004/0017824 A1 * | 1/2004 | Koenck et al. ................ | 370/466 |
| 2004/0018851 A1 * | 1/2004 | Koenck et al. ............. | 455/550.1 |
| 2004/0186907 A1 * | 9/2004 | Wentink ....................... | 709/225 |
| 2005/0059347 A1 * | 3/2005 | Haartsen ..................... | 455/41.2 |

(Continued)

FOREIGN PATENT DOCUMENTS

| | | |
|---|---|---|
| JP | H1155266 A | 2/1999 |
| JP | 2003298593 A | 10/2003 |

(Continued)

OTHER PUBLICATIONS

International Search Report and Written Opinion—PCT/US2012/053615—ISA/EPO—Jan. 2, 2013.

*Primary Examiner* — Parth Patel

(74) *Attorney, Agent, or Firm* — Paul Kuo

(57) ABSTRACT

One aspect of the disclosure provides a method for wireless communication by a station or wireless device. The method includes waking from a sleep state. Further, the method includes determining an availability of a transmission medium. In addition, in response to determining that the transmission medium is not available, the method can include determining a sleep time period, entering a second sleep state based on the sleep time period, and freezing a backoff counter for the duration of the second sleep state.

41 Claims, 7 Drawing Sheets

(56) References Cited

U.S. PATENT DOCUMENTS

| | | | |
|---|---|---|---|
| 2005/0237959 A1* | 10/2005 | Osterloh et al. | 370/310 |
| 2006/0029024 A1* | 2/2006 | Zeng et al. | 370/335 |
| 2006/0034199 A1* | 2/2006 | Chu et al. | 370/310 |
| 2006/0034210 A1* | 2/2006 | Chu et al. | 370/328 |
| 2006/0114823 A1* | 6/2006 | Flemming et al. | 370/229 |
| 2006/0148534 A1* | 7/2006 | Shih | 455/574 |
| 2006/0193274 A1* | 8/2006 | Yamagata | 370/310 |
| 2006/0209772 A1* | 9/2006 | Fang et al. | 370/338 |
| 2007/0254680 A1* | 11/2007 | Nassimi | 455/462 |
| 2007/0290727 A1* | 12/2007 | Jarosinski et al. | 327/161 |
| 2008/0002636 A1* | 1/2008 | Gaur et al. | 370/338 |
| 2008/0112334 A1* | 5/2008 | Laroia et al. | 370/254 |
| 2008/0316963 A1* | 12/2008 | Huang et al. | 370/329 |
| 2009/0103564 A1* | 4/2009 | Lee et al. | 370/470 |
| 2009/0109904 A1* | 4/2009 | Gaur | 370/329 |
| 2009/0122736 A1* | 5/2009 | Damnjanovic et al. | 370/311 |
| 2009/0238319 A1* | 9/2009 | Miller | 375/358 |
| 2010/0020773 A1* | 1/2010 | Jechoux | 370/338 |
| 2010/0284316 A1 | 11/2010 | Sampathkumar | |
| 2012/0020266 A1* | 1/2012 | Sun et al. | 370/311 |
| 2012/0115552 A1 | 5/2012 | Bhattacharya | |
| 2012/0151028 A1* | 6/2012 | Lu et al. | 709/223 |

FOREIGN PATENT DOCUMENTS

| | | | | |
|---|---|---|---|---|
| JP | 2004343245 A | | 12/2004 | |
| JP | 2006222608 A | | 8/2006 | |
| JP | 2008211585 A | | 9/2008 | |
| TW | 201129169 A | * | 8/2011 | ............ H04W 52/02 |
| TW | 201129169 A | | 8/2011 | |

* cited by examiner

SYSTEMS AND METHODS FOR LOW POWER MEDIUM ACCESS

RELATED APPLICATIONS

The present application claims the benefit of the filing date of Provisional Patent Application Ser. No. 61/530,735, filed Sep. 2, 2011, titled "SYSTEMS AND METHODS FOR LOW POWER MEDIUM ACCESS"

FIELD

The present application relates generally to wireless communications, and more specifically to systems, methods, and devices for reducing power consumption by devices communicating over a medium. Certain aspects herein relate to reducing the power expended on determining when a communication medium is free for use for transmission of data over the medium.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Some devices may be idle for extended periods of time. When these devices have data to transmit, the devices may expend significant time and power determining when a communication medium is available such that the devices may transmit the data. The power required to determine when the communication medium is available can shorten both the charge and the lifetime of batteries used by the devices.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the overhead in transmitting payloads in data packets.

One aspect of the disclosure provides a method for wireless communication by a station or wireless device. The method includes waking from a sleep state. Further, the method includes determining an availability of a transmission medium. In addition, in response to determining that the transmission medium is not available, the method can include determining a sleep time period, entering a second sleep state based on the sleep time period, and freezing a backoff counter for the duration of the second sleep state.

In some embodiments, the method can include decrementing the backoff counter in response to waking from the sleep state and determining that the transmission medium is available for at least an availability time period. The method may further include transmitting data when the backoff counter is reduced to zero.

For some implementations, the method may include selecting a value for the backoff counter from a range of values. The range of values may be based on a priority level associated with data to be transmitted by the station. Moreover, the range of values may be based on a priority level associated with the station. In some cases, the value for the backoff counter is selected substantially at random.

Another aspect of the disclosure provides a method for wireless communication by a station. The method includes waking from a sleep state. Further, the method includes determining an availability of a transmission medium. In addition, in response to determining that the transmission medium is not available, the method can include determining a sleep time period and entering a second sleep state based on the sleep time period.

In some instances, the method may include determining the sleep time period based on a measurement of an access-to-medium time without sleep and an average number of trials for the station to determine that the transmission medium is available. The average number of trials is based on an occupancy of the medium. Further, the method may include receiving at least one of the measurement of the access-to-medium time, the average number of trials, and the occupancy of the medium from an access point. In some cases, the measurement of the access-to-medium time is performed at an access point that does not enter a sleep state.

For some embodiments, the method may include determining the sleep time period based on an estimate of an access-to-medium time without sleep and an average number of trials for the station to determine that the transmission medium is available. Further, in some case, the method may include receiving a specification of the sleep time period from an access point. In addition, the method may include determining sleep time period based on a priority level associated with data to be transmitted by the station. Determining the availability of the transmission medium may include determining the availability of the transmission medium over an availability time period.

In certain embodiments, the method may include selecting a backoff counter value. Selecting the backoff counter value may include selecting the backoff counter value from a range of values. Further, in some cases, the range of values may be based on a priority level associated with data to be transmitted by the station. Moreover, in certain implementations, the range of values may be based on a priority level associated with the station.

In some embodiments, the method may include decrementing the backoff counter in response to determining that the transmission medium is available over an availability time period. Further, the method may include transmitting a data packet to an access point in response to the backoff counter satisfying a threshold. In addition, the method may include entering the second sleep state based on the value of the backoff counter.

In some embodiments, the method may include transmitting a data packet to an access point in response to determining that the transmission medium is available. For some instances, entering the second sleep state comprises reducing power to at least one component associated with the station.

Yet another aspect of the disclosure provides for an apparatus for wireless communication. The apparatus includes an active-state controller configured to wake a station from a sleep state. Further, the apparatus includes a transmission activity detector configured to determine the availability of a transmission medium. Moreover, the apparatus includes a processor configured to determine a sleep time period. Further, the active-state controller of the apparatus may be configured to place the station into a second sleep state based on the sleep time period.

Another embodiment of the disclosure provides for an apparatus for wireless communication. The apparatus includes means for waking a station from a sleep state. Further, the apparatus includes means for determining an availability of a transmission medium. Moreover, the apparatus includes means for determining a sleep time period. Additionally, the apparatus includes means for entering a second sleep state based on the sleep time period in response to determining that the transmission medium is unavailable.

Yet another aspect of the disclosure provides for a non-transitory physical computer storage comprising computer executable instructions configured to implement a method for wireless communication by a station. The method includes waking from a sleep state. Further, the method includes determining an availability of a transmission medium. In addition, in response to determining that the transmission medium is not available, the method can include determining a sleep time period and entering a second sleep state based on the sleep time period.

DETAILED DESCRIPTION

Figure 1:
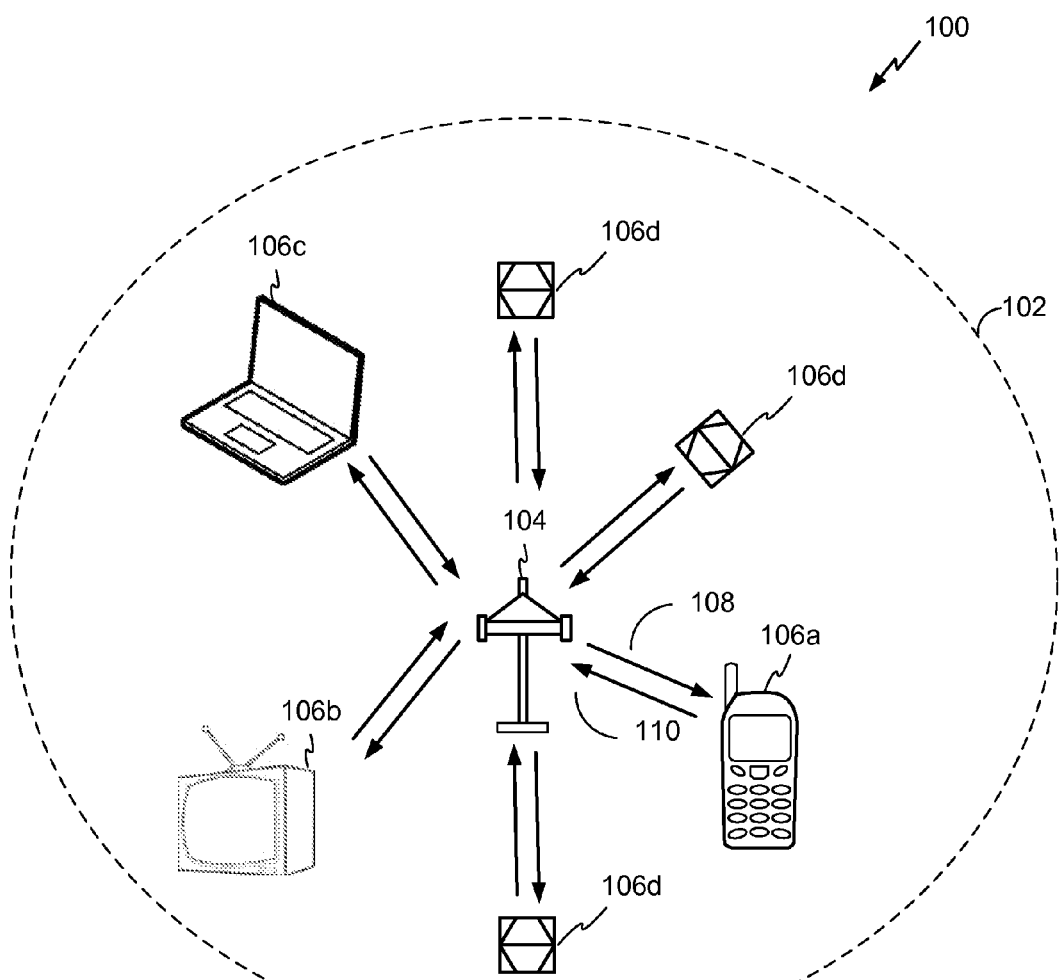
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
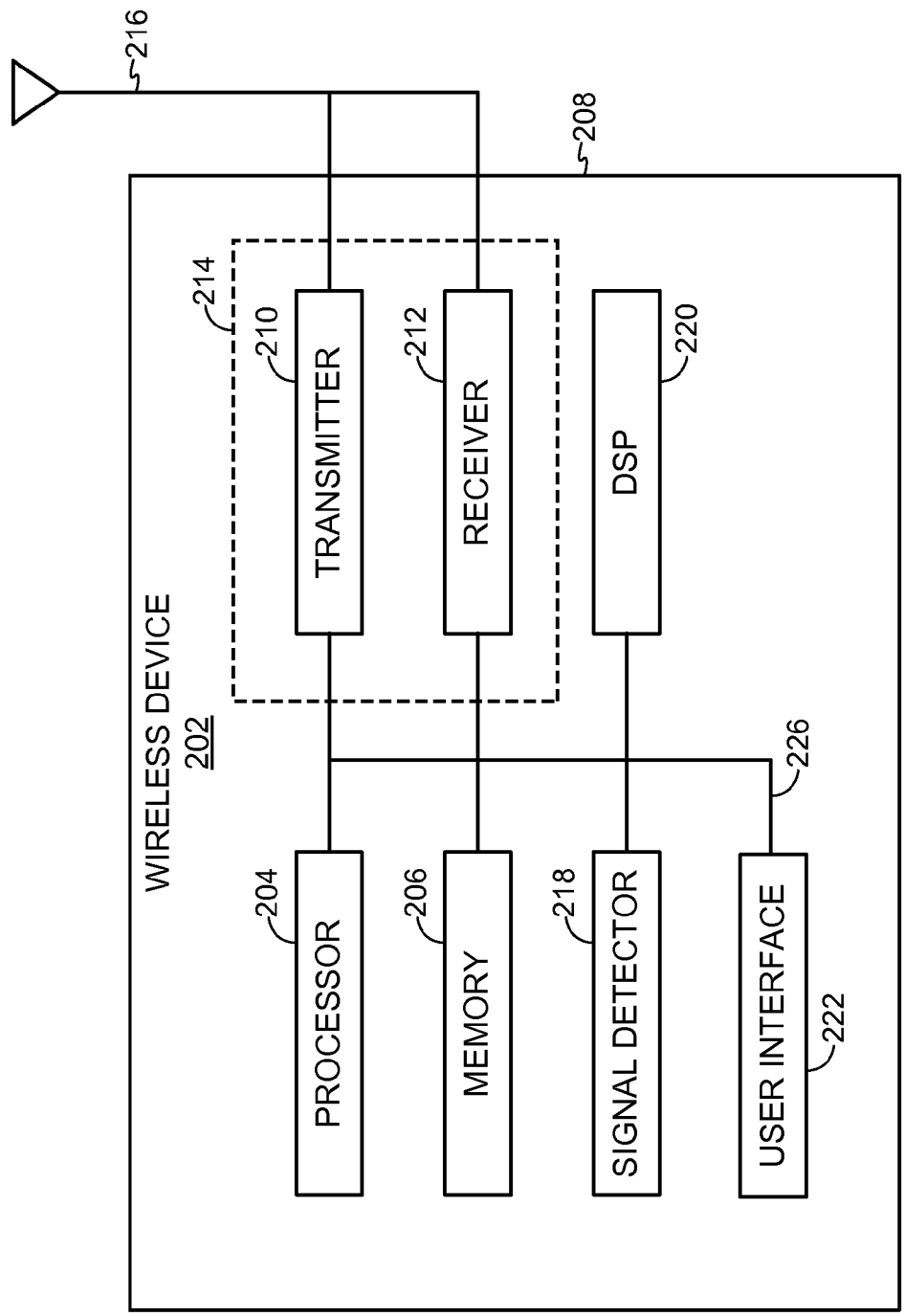
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
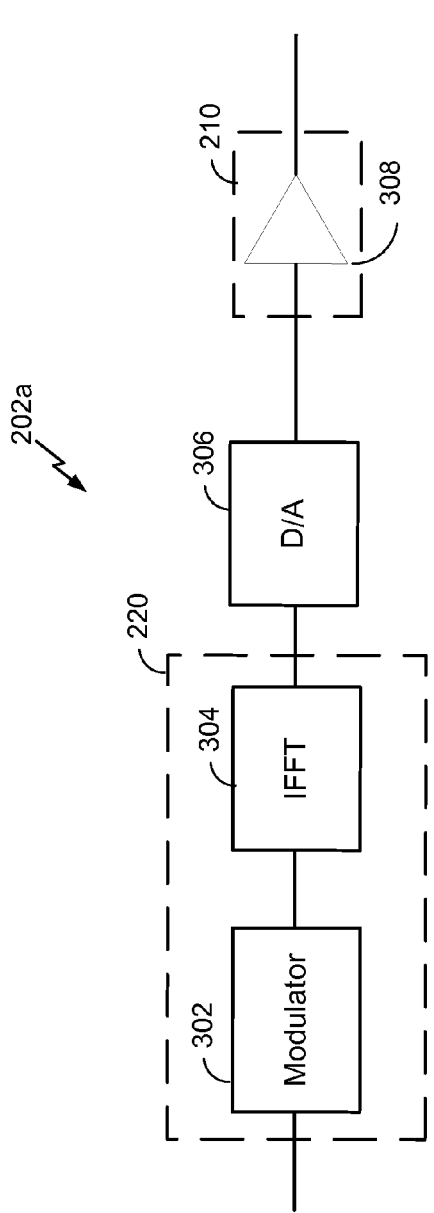
FIG. 3 illustrates an example of components that may be included within the wireless device of FIG. 2 to transmit wireless communications.

As discussed above, the wireless device 202 may comprise an AP 104 or a STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with training fields with peak-to-power average ratio is as low as possible, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmission processor.

The analog signal may be wirelessly transmitted by the transmitter 210. The analog signal may be further processed before being transmitted by the transmitter 210, for example by being filtered or by being upconverted to an intermediate or carrier frequency. In the embodiment illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets, frames, or data units in a wireless signal based on the analog signal. The data units may be generated using the processor 204 and/or the DSP 220, for example using the modulator 302 and the transform module 304 as discussed above.

Figure 4:
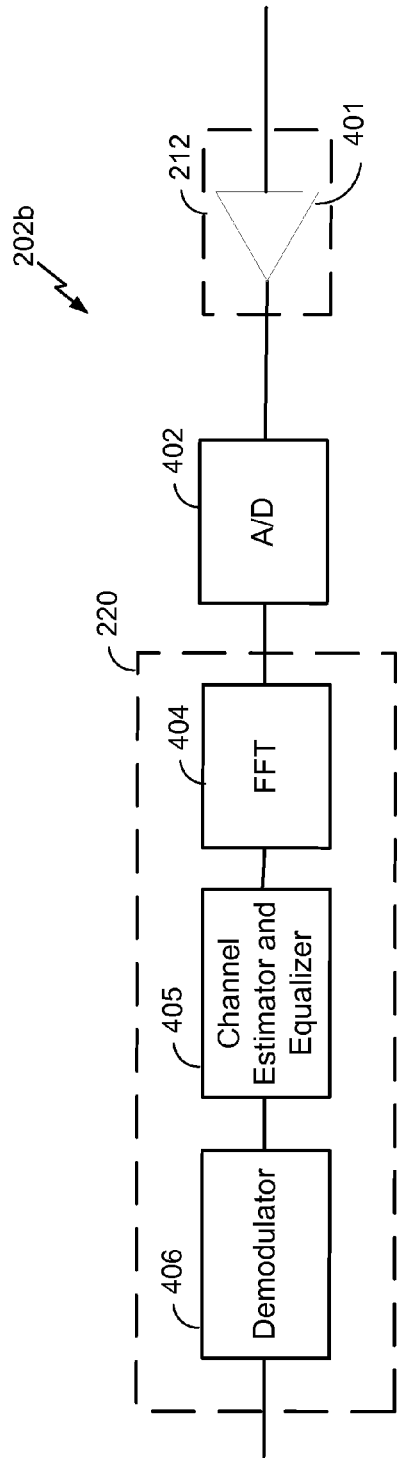
FIG. 4 illustrates an example of components that may be included within the wireless device of FIG. 2 to transmit wireless communications.

FIG. 4 illustrates various components that may be utilized in the wireless device 202 to receive wireless communications. The components illustrated in FIG. 4 may be used, for example, to receive OFDM communications. In some embodiments, the components illustrated in FIG. 4 are used to receive packets, frames, or data units that include one or more training fields, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets, frames, or data units in a wireless signal.

In the embodiment illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet, frame, or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

Some STA 106, particularly, but not limited to, the sensors represented by STA 106d may remain idle for significantly longer than they are transmitting. When the STA 106 has data to transmit, significant power may be expended waiting for the communication medium to be available. This is particularly case when packet durations are long. In some embodiments, to reduce power consumption, the STA 106 can be configured to sleep while waiting for the communication to be available. In some embodiments, any STA 106 can be configured to sleep when idle to reduce power consumption regardless of how often the STA 106 transmits data. Placing the STA 106 into a sleep mode to reduce power consumption is described further with respect to FIGS. 5-8 below. Advantageously, embodiments of the present disclosure are compatible with pre-existing processes and standards associated with IEEE 802.11 among others. For example, embodiments of the present disclosure are compatible with enhanced distributed channel access (EDCA).

Figure 5:
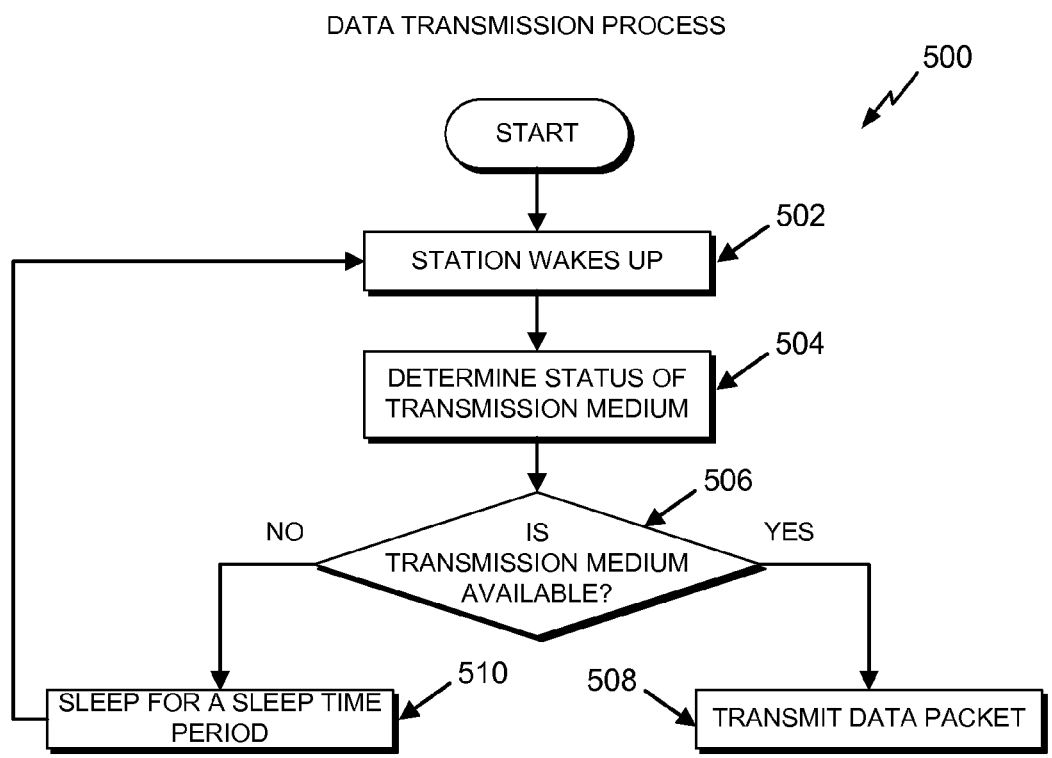
FIG. 5 presents a flowchart for one embodiment of a data transmission process.

FIG. 5 presents a flowchart for one embodiment of a data transmission process 500. The process 500 can be implemented by any STA, such as STA 106a-d. Further, the process 500 can be implemented by any component of a STA 106 or a wireless device 202 that can control the power consumption of the device of a component of the device. For example, the process 500 can be implemented by a processor 204, a transceiver 214, or a DSP 220, to name a few. To simplify discussion, the process 500 will be described generally as being implemented by a STA 106. Further, to simplify discussion, operations associated with the process 500 may be described as occurring in a particular order. However, unless specifically stated, the order of the operations of process 500 are not limited as such. The operations associated with the process 500 may be modified and/or may occur in a different order. Further, some operations may be optional and/or may occur more or less frequently than described.

The process 500 begins at block 502 when, for example, the STA 106 wakes up. The STA 106 may wake up due to a variety of triggers. For example, the STA 106 may wake up in response to receiving, generating, accessing, or otherwise acquiring data to transmit. For instance, if the STA 106 is an earthquake sensor, the STA 106 may wake up in response to sensing an earthquake, or other geological activity associated with earthquake detection or prediction. In certain embodiments, the STA 106 waking includes one or more components associated with the STA 106 waking. For example, the STA 106 waking may include a transceiver 214 associated with the STA 106 waking. In certain embodiments, one or more components associated with the STA 106 may already be active and not require waking. For instance, a geological sensor associated with the STA 106 may remain active at all times to detect possible earthquake activity. In some embodiments, the block 502 may be optional. For instance, the STA 106 may already be awake. Generally, the STA 106 waking includes supplying power or increasing the amount of power supplied to one or more components associated with the STA 106.

At block 504, the STA 106 determines the status of the transmission medium. Determining the status of the transmission or communication medium may include determining if the transmission medium is available for the STA 106 to transmit data. In some embodiments, determining if the transmission medium is available includes determining if the transmission medium is available for a minimum period of time. In some implementations, the minimum period of time can be a Distributed Coordination Function (DCF) Interframe Space (DIFS) duration. Alternatively, the minimum period of time can be any period of time that can be used to determine if the transmission medium is available.

At decision block 506, the STA 106 determines whether the transmission medium status indicates that the transmission medium is available. If so, the STA 106 transmits the data packet at block 508. If the STA 106 determines that the transmission medium status indicates that the transmission medium is not available for use by the STA 106, the STA 106 goes to sleep for a sleep time period. In some embodiments, going to sleep can include reducing power consumption or eliminating power consumption to one or more components associated with the STA 106, such as the transceiver 214.

In some embodiments, the sleep time is determined such that the total access-to-medium time is comparable to EDCA. In an embodiment, this may be represented as Sleep Time*K=$T_{edca}$, where:

K is an average number of trials for the STA to see the medium as idle. This may be a function of the medium occupancy.

$T_{edca}$ is the access-to medium time in EDCA, and may be a function of the backoff counter.

In some embodiments, the sleep time period may be predefined for the STA 106, for all STA of a specific type, or for all STA 106 associated with the BSA 102 or the wireless communication system 100. In certain implementations, the AP 104 may specify the sleep time. In some embodiments, the AP 104 may specify the sleep time based on one or more of a measurement of an access-to-medium time without sleep, an estimate of an access-to-medium time without sleep, and an average number of trials for the STA 106 to determine that the transmission medium is available. In some cases, the average number of trials may be based on an occupancy of the communication medium. In an embodiment, the average number of trials may be received by the STA. For example, the STA may receive the average number of trials from the AP 104. In an embodiment, the AP 104 broadcasts the average number of trials in a beacon signal. In an embodiment, the AP 104 broadcasts a value of $T_{edca}$ to the station. In an embodiment, the STA determines a sleep time based on a $T_{edca}$ value.

Figure 6:
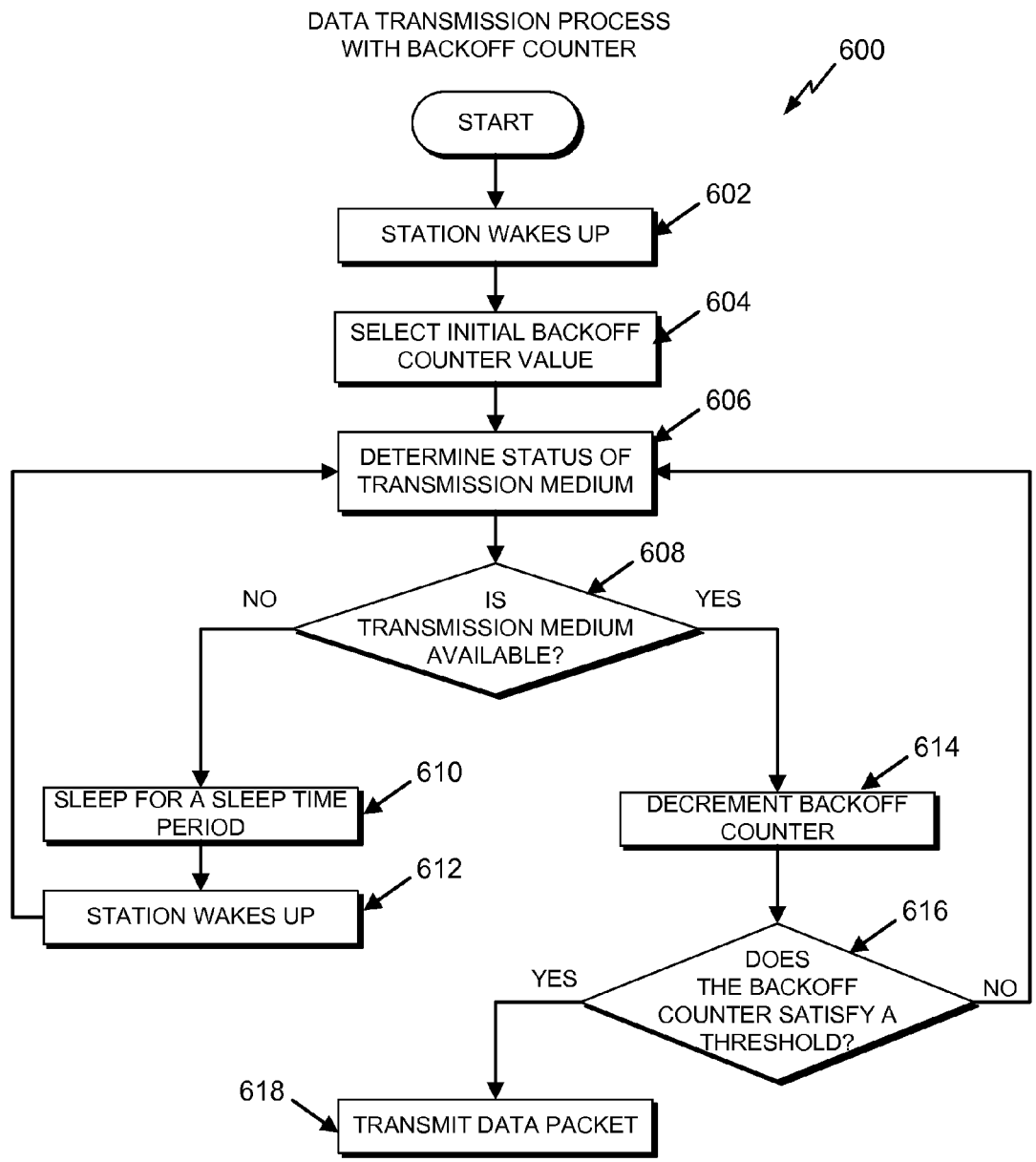
FIG. 6 presents a flowchart for one embodiment of a data transmission process using a backoff counter.

FIG. 6 presents a flowchart for one embodiment of a data transmission process 600 using a backoff counter. The process 600 can be implemented by any STA, such as STA 106a-d. Further, the process 600 can be implemented by any component of a STA 106 or a wireless device 202 that can control the power consumption of the device of a component of the device. For example, the process 600 can be implemented by a processor 204, a transceiver 214, or a DSP 220, to name a few. To simplify discussion, the process 600 will be described generally as being implemented by a STA 106. Further, to simplify discussion, operations associated with the process 600 may be described as occurring in a particular order. However, unless specifically stated, the order of the operations of process 600 are not limited as such. The operations associated with the process 600 may be modified and/or may occur in a different order. Further, some operations may be optional and/or may occur more or less frequently than described.

The process 600 begins at block 602 when, for example, the STA 106 wakes up. The STA 106 may wake up due to a variety of triggers. For example, the STA 106 may wake up in response to receiving, generating, accessing, or otherwise acquiring data to transmit. For instance, if the STA 106 is an earthquake sensor, the STA 106 may wake up in response to sensing an earthquake, or other geological activity associated with earthquake detection or prediction. In certain embodiments, the STA 106 waking includes one or more components associated with the STA 106 waking. For example, the STA 106 waking may include a transceiver 214 associated with the STA 106 waking. In certain embodiments, one or more components associated with the STA 106 may already be active and not require waking. For instance, a geological sensor associated with the STA 106 may remain active at all times to detect possible earthquake activity. In some embodiments, the block 602 may be optional. For instance, the STA 106 may already be awake. Generally, the STA 106 waking includes supplying power or increasing the amount of power supplied to one or more components associated with the STA 106.

Next, the STA 106 selects an initial backoff counter value at block 604. In some embodiments, the STA 106 may select the initial backoff counter value pseudo-randomly, substantially randomly, or randomly. Further, the initial backoff counter value may be selected from a range of values. This range of values may be based on a priority associated with one or more of the STA 106 and data for transmission by the STA 106. For example, if the STA 106, or the data, is associated with a high priority, the STA 106 may select the backoff counter value from a set of values between zero and five. However, if the STA 106, or the data, is associated with a low or lower priority, the STA 106 may select the backoff counter value from a set of values between zero and ten.

In some cases, the range of values may be selected to ensure a minimum backoff value greater than zero and/or greater than one. For example, the lower priority STA 106 may select the backoff counter value from a set of values between five and ten thereby ensuring that the backoff counter value will be of at least a minimum value of five. The higher priority STA 106 may select a backoff counter value from a set of values between one and five thereby ensuring that the backoff counter value will be non-zero. Although the above examples describe two priority levels, the process 600 is not limited as such. Any number of priority levels may be associated with the various STAs and/or data packets to be transmitted. For example, there may exist five different priority levels each associated with a different range of possible backoff values. Further, although the backoff counter values have been described as positive integer values, the backoff counter values are not limited as such. For example, the backoff counter values may be fractions between zero and one, or may include negative values.

At block 606, the STA 106 determines the status of the transmission medium. Determining the status of the transmission or communication medium may include determining if the transmission medium is available for the STA 106 to transmit data. In some embodiments, determining if the transmission medium is available includes determining if the transmission medium is available for a minimum period of time. In some implementations, the minimum period of time can be a Distributed Coordination Function (DCF) Interframe Space (DIFS) duration. Alternatively, the minimum period of time can be any period of time that can be used to determine if the transmission medium is available.

Upon determining the transmission medium status, the STA 106 determines at decision block 608 whether the transmission medium status indicates that the transmission medium is available. If not, the STA 106 goes to sleep for a sleep time period in block 610. In some embodiments, going to sleep can include reducing power consumption or eliminating power consumption to one or more components associated with the STA 106, such as the transceiver 214.

In some embodiments, the sleep time period may be predefined for the STA 106, for all STA of a specific type, or for all STA 106 associated with the BSA 102 or the wireless communication system 100. In certain implementations, the AP 104 may specify the sleep time. In some embodiments, the AP 104 may specify the sleep time based on one or more of a measurement of an access-to-medium time without sleep, an estimate of an access-to-medium time without sleep, and an average number of trials for the STA 106 to determine that the transmission medium is available. In some cases, the average number of trials may be based on an occupancy of the communication medium. In some embodiments, the average number of trials may be received from the AP 104.

After sleeping for the sleep time period at block 610, the STA 106 wakes at block 612. In some embodiments, the block 612 can include one or more of the embodiments described above with respect to the block 602. Upon completing the process associated with the block 612, the process 600 returns to the block 606 as illustrated in FIG. 6.

If at decision block 608 the STA 106 determines that the transmission medium status indicates that the transmission medium is available, the STA 106 decrements the backoff counter value at block 614. Generally, the STA 106 decrements the backoff counter value by one unit or value. The unit or value may differ based on the type of value used for the backoff counter. For example, the unit may be an integer or a fraction. In some embodiments, the STA 106 may decrement the backoff counter value by more than one unit or value. For example, a high priority STA may be configured to decrement the backoff counter by two units at block 614 while a low priority STA may be configured to decrement the backoff counter by one unit. Further, in certain embodiments, the STA 106 may increment the backoff counter value at block 614. For example, if the initial backoff counter value is associated with a negative integer, the STA 106 may increment the backoff counter instead of decrementing the backoff counter.

After completing the process associated with the block 614, the STA 106 determines if the backoff counter satisfies a threshold at decision block 616. Satisfying a threshold in one embodiment may indicate the backoff counter is equal to the threshold. In another embodiment, satisfying the threshold may indicate that the backoff counter is greater than, less than, greater than or equal to, or less than or equal to the threshold.

In an embodiment, the threshold is zero. In other embodiments, the threshold may be another value. For example, in some embodiments, the threshold may be a non-zero value. If the backoff counter does not satisfy the threshold, the process 600 returns to the block 606 as illustrated in FIG. 6.

If the backoff counter satisfies the threshold at decision block 616, the STA 106 transmits the data packet at block 618. Advantageously, in some embodiments, the communication medium is likely to be available at block 618 because it was available at decision block 608.

In certain embodiments, the transmission medium may be available at decision block 608, but, if the backoff counter associated with the STA 106 does not satisfy the threshold at block 616, the STA 106 may not transmit data. Instead, process 600 returns to block 606 and processing continues as described above. Advantageously, in certain embodiments, the use of the backoff counter to defer transmission of a data packet facilitates prioritizing data traffic. An initial backoff counter value selected in block 604 may vary across STAs communicating on a wireless network. In an embodiment, initial backoff counter values may be assigned to an STA based on the priority of the STA or the priority of the STA's data streams. Higher priority STAs or data streams may be assigned lower initial backoff counter values than lower priority STAs. This may provide higher priority STAs or data streams with an ability to transmit data during a contention period earlier than lower priority STAs or data streams.

Figure 7:
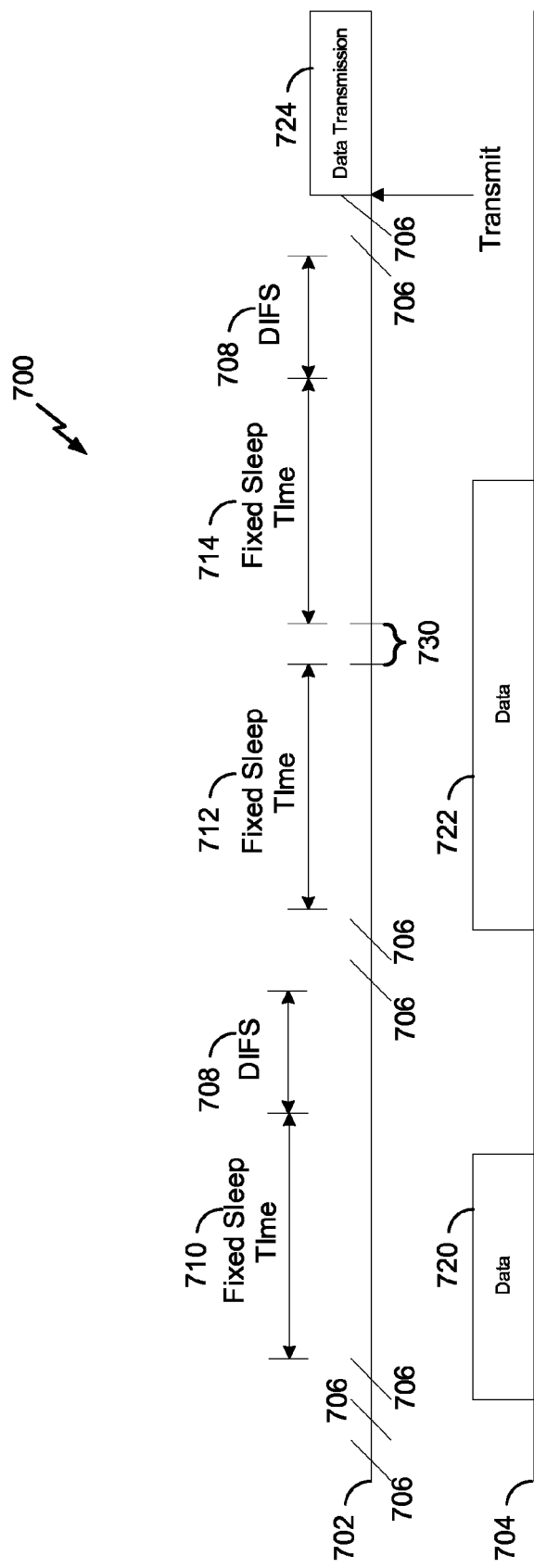
FIG. 7 illustrates an example of a packet flow in accordance with an embodiment of the present disclosure.

FIG. 7 illustrates an example of a packet flow 700 in accordance with an embodiment of the present disclosure. The packet flow 700 includes two synchronous relative timelines. The timeline 702 represents the state of a STA, such as the STA 106. The timeline 704 represents the state of a communication medium that the STA 106 is attempting to use to transmit data. Each diagonal slash 706 is equivalent to one entire DIFS 708. The diagonal slashes 706 are used to help compress the illustration and is not intended to differ from the DIFS 708.

At the beginning of the packet flow 700, the STA 106 has data to transmit across the communication medium. The STA 106 may have woken from a sleep state or may have been active at the beginning of the packet flow 700 when the STA 106 first obtains data to transmit. In the example associated with the packet flow 700, the STA 106 includes a backoff counter. During initialization of the backoff counter, the STA 106, randomly or pseudo-randomly, selects a backoff counter value of nine. Thus, in this example, the STA 106 will not transmit the data until the backoff counter has been decremented nine times. Further, in this example, the STA 106 decrements the backoff counter each time the STA 106 determines that the communication medium is available, or not transmitting data, for at least a DIFS time period.

As represented by the three slashes 706 at the beginning of the packet flow 700, the STA 106 determines that the communication medium is available for three DIFS time periods. Thus, after each slash 706, the STA 106 decrements its backoff counter by one and therefore the backoff counter value is six at the end of the first three slashes 706.

During the fourth DIFS time period, the STA 106 detects data 720 being transmitted in the communication medium by another device or STA. Thus, the STA 106 sleeps for a first time period 710. At the detection of the data 720 in the communication channel and during the time period 710, the backoff counter is not decremented. Upon waking, at the end of the first time period 710, the STA 106 determines that the communication medium is free for at least a DIFS 708 and thus, decrements the backoff counter from six to five. In the example flow 700, the STA 106, for two more DIFS periods as represented by the slashes 706, determines that the communication medium is free and reduces the backoff counter from five to four and then to three.

The STA 106 then detects the data 722 being transmitted in the communication medium. The same device or STA that transmitted the data 720 may also transmit the data 722. Alternatively, another device or STA may transmit the data 722. In response to detecting the data 722, the STA 106 sleeps for a second time period 712. Generally, each sleep time period is substantially equivalent. However, in some embodiments, the sleep times may differ. For example, in some implementations, each sleep time may be incrementally longer or shorter based on, for example, STA priority.

Upon completion of the second sleep time period 712, the STA 106 awakens and determines the availability of the communication medium. The gap 730 is representative of the time during which the STA 106 is determining whether the communication medium is available. Generally, this time is less than a DIFS time period because upon detecting the data 722 in the communication medium, the STA 106 is configured to sleep. In some embodiments, the gap 730 may be equivalent to a DIFS. In response to determining that the data 722 is still being transmitted, the STA 106 sleeps for a third time period 714.

Upon completion of the third sleep time period 714, the STA 106 awakens and determines the availability of the communication medium. The STA 106, in this example, determines that the communication medium is available for at least a DIFS time period 708. Thus, the STA 106 reduces the backoff counter from three to two. The STA 106 then determines that the communication medium remains available for at least two more DIFS periods as indicated by the two slashes 706. Therefore, at the end of each DIFS period represented by the slashes 706, the STA 106 reduces the backoff counter from two to one to zero respectively. Upon the backoff counter reaching zero, the STA 106 transmits data 724.

In certain embodiments, if the STA 106 has additional data to transmit, a substantially similar process is repeated. In some cases, the same backoff counter may be used. In other instances, a new backoff counter may be selected. Further, the range of values from which the backoff counter is selected may remain the same. In some embodiments, the range of values may be adjusted. For example, if the priority of the data to be transmitted differs, the range of values from which the backoff counter is selected may be adjusted.

Figure 8:
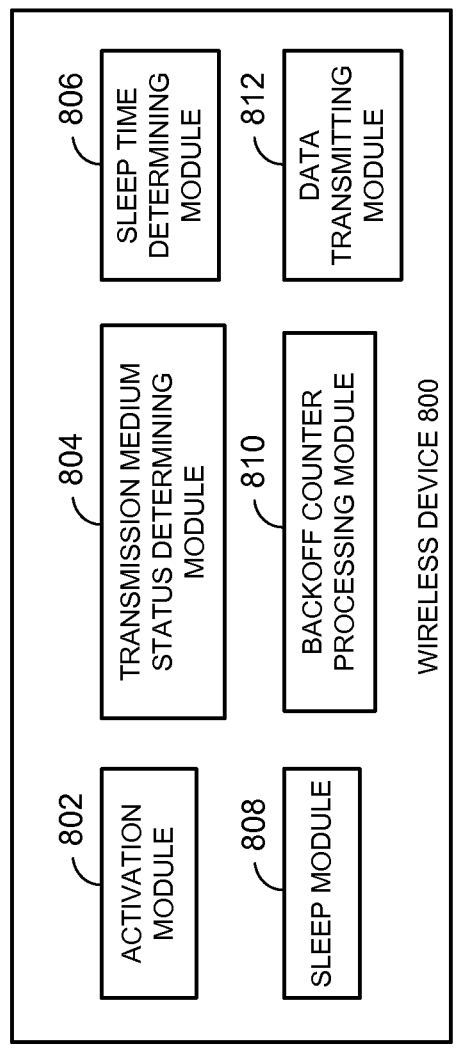
FIG. 8 illustrates another example of a wireless device that may be employed within the wireless communication system of FIG. 1.

FIG. 8 illustrates another example of a wireless device 800 that may be employed within the wireless communication system of FIG. 1. The wireless device 800 comprises an activation module 802, a transmission medium status determining module 804, a sleep time determining module 806, a sleep module 808, a backoff counter processing module 810, and a data transmitting module 812. The activation module 802 is capable of waking a STA 106 by, for example, supplying power to one or more components associated with the STA 106. Further, the activation module 802 may be configured to perform one or more of the functions discussed above with respect to the blocks 502, 602, and 612. The activation module 802 may correspond to one or more of the processor 204, the DSP 220, or a power supply (not shown). Further, the activation module 802 may include one or more of the processor 204, the DSP 220, a transceiver 214, a signal detector 218, a memory 206, a power supply, and any other component that may facilitate performing one or more of the functions discussed above with respect to the blocks 502, 602, and 612.

The transmission medium status determining module 804 is capable of determining the status of a transmission medium or communication medium. Determining the status of the transmission medium can include determining whether the transmission medium or communication medium is available for the wireless device 800 to transmit data. Further, the transmission medium status determining module 804 may be configured to perform one or more of the functions discussed above with respect to the blocks 504, 506, 606, and 608. The transmission medium status determining module 804 may correspond to one or more of the processor 204, the DSP 220, the transceiver 214, or the signal detector 218. Further, the transmission medium status determining module 804 may include one or more of the processor 204, the DSP 220, the transceiver 214, the signal detector 218, the memory 206, and any other component that may facilitate performing one or more of the functions discussed above with respect to the blocks 504, 506, 606, and 608.

The sleep time determining module 806 is capable of determining the length of time that the STA 106 should sleep, power down, or reduce power to one or more components associated with the STA 106. Further, the sleep time determining module 806 may be configured to perform one or more of the functions discussed above with respect to the blocks 510 and 610. The sleep time determining module 806 may correspond to one or more of the processor 204, the DSP 220, or a power supply (not shown). Further, the sleep time determining module 806 may include one or more of the processor 204, the DSP 220, the transceiver 214, the signal detector 218, the memory 206, a power supply, and any other component that may facilitate performing one or more of the functions discussed above with respect to the blocks 510 and 610.

The sleep module 808 is capable of placing the STA 106 into a sleep mode. Placing the STA 106 into a sleep mode can include reducing or ceasing to supply power to the STA 106 or one or more components associated with the STA 106. Further, the sleep module 808 may be configured to perform one or more of the functions discussed above with respect to the blocks 510 and 610. The sleep module 808 may correspond to one or more of the processor 204, the DSP 220, or a power supply (not shown). Further, the sleep module 808 may include one or more of the processor 204, the DSP 220, the transceiver 214, the signal detector 218, the memory 206, a power supply, and any other component that may facilitate performing one or more of the functions discussed above with respect to the blocks 510 and 610.

The backoff counter processing module 810 is capable of generating or selecting a backoff counter value and decrementing the backoff counter value in response to a determination that the transmission medium is available for the transmission of data. Further, the backoff counter processing module 810 may be configured to perform one or more of the functions discussed above with respect to the blocks 604, 614, and 616. The backoff counter processing module 810 may correspond to one or more of the processor 204 and the DSP 220. Further, the backoff counter processing module 810 may include one or more of the processor 204, the DSP 220, the transceiver 214, the signal detector 218, the memory 206, and any other component that may facilitate performing one or more of the functions discussed above with respect to the blocks 604, 614, and 616.

The data transmitting module 812 is capable of transmitting data via a transmission medium. Further, the data transmitting module 812 may be configured to perform one or more of the functions discussed above with respect to the blocks 508, 616, and 618. The data transmitting module 812 may correspond to one or more of the transmitter 210 and the transceiver 214. Further, the data transmitting module 812 may include one or more of the processor 204, the DSP 220, the transceiver 214, the signal detector 218, the memory 206, and any other component that may facilitate performing one or more of the functions discussed above with respect to the blocks 508, 616, and 618.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infra-red, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for accessing a shared medium in wireless communication by a station, comprising:
   waking from a sleep state;
   selecting a backoff counter value;
   determining an availability of a transmission medium comprising determining whether the transmission medium is available for a minimum period of time;
   in response to determining that the transmission medium is not available for the minimum period of time, determining a sleep time period based at least in part on the availability of the transmission medium, and entering a second sleep state based at least in part on the sleep time period and the backoff counter value; and
   freezing the backoff counter value for the duration of the second sleep state.

2. The method of claim 1, further comprising selecting the backoff counter value pseudo-randomly.

3. The method of claim 1, further comprising decrementing the backoff counter value in response to waking from the sleep state and determining that the transmission medium is available for at least an availability time period.

4. The method of claim 3, further comprising transmitting data when the backoff counter value is reduced to zero.

5. The method of claim 1, further comprising selecting the backoff counter value based on a priority level associated with data to be transmitted by the station.

6. The method of claim 1, further comprising selecting the backoff counter value based on a priority level associated with the station.

7. The method of claim 1, further comprising selecting the backoff counter value substantially at random.

8. The method of claim 1, further comprising determining the sleep time period based on a measurement of an access-to-medium time without sleep and an average number of trials for the station to determine that the transmission medium is available.

9. The method of claim 8, wherein the average number of trials is based on an occupancy of the transmission medium.

10. The method of claim 9, further comprising receiving at least one of the measurement of the access-to-medium time, the average number of trials, and the occupancy of the transmission medium from an access point.

11. The method of claim 8, wherein the measurement of the access-to-medium time is performed at an access point that does not enter a sleep state.

12. The method of claim 8, wherein the measurement of the access-to-medium time without sleep is performed at an access point that does not enter a sleep state.

13. The method of claim 1, further comprising receiving a specification of the sleep time period from an access point used for smart metering or in a smart grid network.

14. The method of claim 1, further comprising decrementing the backoff counter value in response to determining that the transmission medium is available over an availability time period.

15. The method of claim 14, further comprising transmitting a data packet to an access point in response to the backoff counter value satisfying a threshold.

16. The method of claim 1, further comprising transmitting a data packet to an access point in response to determining that the transmission medium is available.

17. The method of claim 1, wherein entering the second sleep state comprises reducing power to at least one component associated with the station.

18. An apparatus for accessing a shared medium in wireless communication, comprising:
   an active-state controller configured to wake a station from a sleep state;
   a backoff controller configured to select a backoff counter value;
   a transmission activity detector configured to determine the availability of a transmission medium comprising determining whether the transmission medium is available for a minimum period of time; and
   a processor configured to determine, in response to the transmission activity detector determining that the transmission medium is unavailable for the minimum period of time, a sleep time period based at least in part on the availability of the transmission medium,
   wherein the active-state controller is further configured to place the station into a second sleep state based at least in part on the sleep time period and the backoff counter value, and
   wherein the backoff controller is further configured to freeze the backoff counter value for the duration of the second sleep state.

19. The apparatus of claim 18, wherein the backoff controller is further configured to select the backoff counter value pseudo-randomly.

20. The apparatus of claim 18, wherein the backoff controller is further configured to select the backoff counter value at random or substantially at random.

21. The apparatus of claim 18, wherein the processor is further configured to determine the sleep time period based on a measurement of an access-to-medium time and an average number of trials for the station to determine that the transmission medium is available.

22. The apparatus of claim 21, wherein the average number of trials is based on an occupancy of the transmission medium.

23. The apparatus of claim 22, further comprising a receiver configured to receive at least one of the measurement of the access-to-medium time, the average number of trials, and the occupancy of the transmission medium from an access point.

24. The apparatus of claim 18, further comprising a receiver configured to receive a specification of the sleep time period from an access point used for smart metering or in a smart grid network.

25. The apparatus of claim 18, wherein the processor is further configured to determine the sleep time period based on a priority level associated with data to be transmitted by the station.

26. The apparatus of claim 18, wherein the processor is further configured to select the sleep time period based on a priority level associated with the station.

27. The apparatus of claim 18, wherein the backoff controller is further configured to determine the backoff counter value based on a priority level associated with data to be transmitted by the station.

28. The apparatus of claim 18, wherein the backoff controller is further configured to select the backoff counter value based on a priority level associated with the station.

29. The apparatus of claim 18, wherein the backoff controller is further configured to decrement the backoff counter value in response to the transmission activity detector determining that the transmission medium is available over an availability time period.

30. The apparatus of claim 29, further comprising a transmitter configured to transmit a data packet to an access point in response to the backoff counter value satisfying a threshold.

31. The apparatus of claim 18, wherein placing the station into the second sleep state comprises reducing power to at least one component associated with the station.

32. An apparatus for accessing a shared medium in wireless communication, comprising:
    means for waking a station from a sleep state;
    means for selecting a backoff counter value;
    means for determining an availability of a transmission medium comprising determining whether the transmission medium is available for a minimum period of time;
    means for determining, in response to determining that the transmission medium is unavailable for the minimum period of time, a sleep time period based at least in part on the availability of the transmission medium;
    means for entering a second sleep state based at least in part on the sleep time period and the backoff counter value; and
    means for freezing the backoff counter value for the duration of the second sleep state.

33. The apparatus of claim 32, wherein the means for selecting the backoff counter value comprises means for selecting the backoff counter value pseudo-randomly.

34. The apparatus of claim 32, wherein the means for selecting the backoff counter value comprises means for selecting the backoff counter value at random or substantially at random.

35. The apparatus of claim 32, further comprising a means for decrementing the backoff counter value in response to the means for determining the availability of the transmission medium determining that the transmission medium is available.

36. The apparatus of claim 35, further comprising a means for transmitting data in response to the backoff counter value satisfying a threshold.

37. A non-transitory computer-readable medium comprising computer executable instructions for accessing a shared medium in wireless communication by a station, the instructions executable by a processor to:
    wake from a sleep state;
    select a backoff counter value;
    determine an availability of a transmission medium comprising determining whether the transmission medium is available for a minimum period of time;
    in response to determining that the transmission medium is not available for the minimum period of time, determine a sleep time period based at least in part on the availability of the transmission medium, and enter a second sleep state based at least in part on the sleep time period and the backoff counter value; and
    freeze the backoff counter value for the duration of the second sleep state.

38. The non-transitory computer readable medium of claim 37, further comprising instructions that when executed, cause the processor to select the backoff counter value pseudo-randomly.

39. The non-transitory computer readable medium of claim 37, further comprising instructions that when executed, cause the processor to select the backoff counter value at random or substantially at random.

40. The non-transitory computer readable medium of claim 37, further comprising instructions that when executed, cause the processor to decrement the backoff counter value in response to waking from the sleep state and determining determine that the transmission medium is available for at least an availability time period.

41. The non-transitory computer readable medium of claim 40, further comprising instructions that when executed, cause the processor to transmit data when the backoff counter value is reduced to zero.

* * * * *